April 21, 1942.                M. ANDIS                2,280,363
SHEARING AND SHAVING HEAD FOR HAIR CLIPPERS
Filed April 30, 1938

INVENTOR.
MATHEW ANDIS

BY

Wheeler, Wheeler & Wheeler
ATTORNEYS

Patented Apr. 21, 1942

2,280,363

UNITED STATES PATENT OFFICE 2,280,363

SHEARING AND SHAVING HEAD FOR HAIR CLIPPERS

Mathew Andis, Racine, Wis.

Application April 30, 1938, Serial No. 205,255

8 Claims. (Cl. 30—43)

My invention relates to improvements in shearing and shaving heads for hair clippers of the general type disclosed in my companion applications, Serial Numbers 67,195 and 67,196, filed March 5, 1937.

The object of the invention herein disclosed is to reduce the cost of manufacture and provide a more efficient clipping head than any heretofore made.

In the drawing.

Like parts are designated by the same reference characters throughout the several views.

Figure 1:
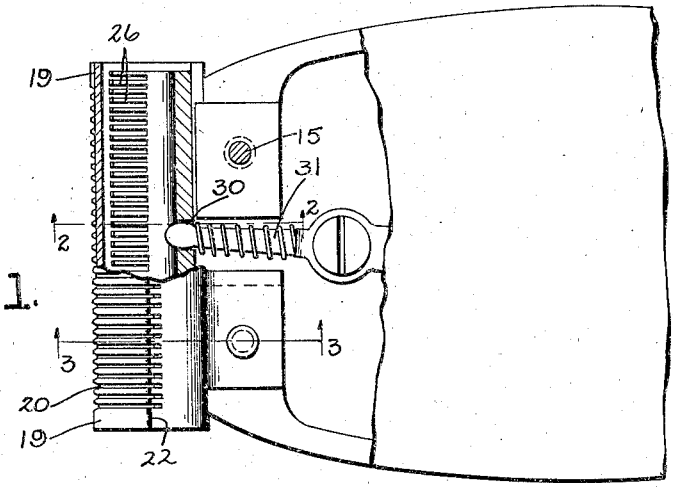
Figure 1 is a plan view of my improved clipping head, with the shear bar partially broken away.
Figure 2:
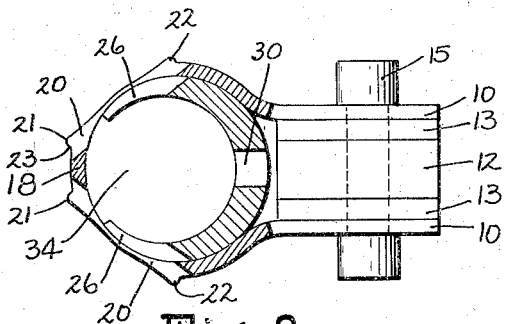
Figure 2 is a sectional view, drawn to line 2—2 of Figure 1.
Figure 3:
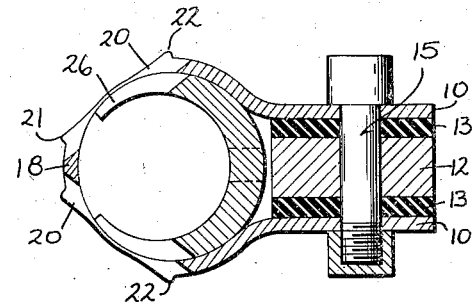
Figure 3 is a sectional view drawn to line 3—3 of Figure 1.

My improved shear bar is of a generally cylindrical form, with a cylindrical cavity encircled by a wall, the outer surface of which is eccentrically thickened rearwardly from the clipping zones, and preferably extended in the form of supporting shank plates 10 and spacing blocks 12 mounted between the end portions of the plates 10.

Slabs 13 of rubber or equivalent resilient material may be interposed between the plates 10 and spacing blocks 12, and the assembly secured together by bolts or pins 15 which are extended in the form of studs to facilitate connecting the shear bar to a motor casing or handle.

The forward portion of the shear bar is arcuately slotted at each side of a web 18 which connects the end wall members 19. The slots provide arcuate sets of shear teeth 20. The outer surface of each of these teeth 20 is formed with spur-like combing projections 21 and 22, which preferably incline divergently and may terminate in abrupt shoulders 23. Between the inclined faces of the spurs the outer surface of each tooth is only slightly arcuate, and except for the portions occupied by the spurs the teeth may be made very thin, preferably not more than twenty-five ten thousandths (.0025) of an inch in thickness in the thickest portions. The web 18 between the two sets of shear teeth cooperates with the rear portion of the shear bar and with the combing spurs in furnishing adequate support for the teeth.

Each shear bar tooth has its thin central portion adequately supported against deformation because it has the form of an arch of short length sprung from the relatively thick spurs which form the end portions of the teeth. These spurs are substantially rigid, since the spur at one end of the tooth is supported by the bar or web 18, and the spur at the other end of the tooth is carried by the rear portion or body of the shear bar. Therefore, the central arch springs from fixed abutments, and inasmuch as its pressure upon the scalp is distributed almost uniformly throughout the length of the arch, it is adequately supported against deformation, and particularly so since it is subject to the internal supporting pressure of the arched cutter teeth.

The working portions of the teeth extend from the forward combing spurs 21 to their rear ends. A vibratory arcuate cutter bar is mounted in the cylindrical bore or cavity of the shear bar and arcuately slotted along its forward margins to provide rows of cutter teeth 26 in registry with the shear teeth 20 between the front spurs 21 and the rear ends of the teeth 20. The registering portions of the cutter bar teeth and shear bar teeth constitute the clipping zones.

The rear portion of the cutter bar is thickened and provided with a notch or aperture 30 to receive an actuating arm 31, by means of which the cutter may be axially vibrated. Electrical or electromagnetic power will be preferably employed, as is customary in the operation of power driven hair clippers.

The cutter bar is preferably formed of resilient material and inserted in the bore of the shear bar under compression. Therefore, it tends to take up wear. But if the shear bar is formed with shank plates 10, cushioned upon resilient slabs 13 and connected by clamping screws or bolts 15, the shear may also be contracted to take up wear. The contacting pressure of the cutter bar upon the shear bar will be along the outer surfaces of the cutter bar teeth 26 and the concentric surfaces of the shear bar teeth. Between these portions and the reenforcing web 18, the spaces between the shear teeth are open to the cavity 34, whereby hair combed by these portions of the teeth and by the spurs 21 may freely enter.

The outer surfaces of the shear bar teeth of each set, which surfaces lie between the points of their spurs 21 and 22, conform nearly to an oblique tangential plane, having an approximately thirty degree pitch toward a plane parallel to its shank plates 10, and which includes the axis of the shear bar and its web 18. Preferably these outer surfaces deviate from said oblique plane in an outwardly bulging arc of slight curvature in those portions between the spurs, which are nearly concentric to the inner surfaces. In these portions of the clipping or shearing zone the teeth may be very thin, and extremely close cutting is therefore possible.

When clamping pressure is applied to the shank plates 10, the shear bar bore tends to contract on the rear side and develop a slight eccentricity which forces the cutter bar forwardly. This forward pressure is exerted against the thin portions of the shearing teeth, and not only ensures a working pressure contact in the zone occupied by these portions, but also resists the tendency of these portions of the shear teeth to bend more readily than the other portions of the shear bar.

It will be understood that the cutter bar may be vibrated axially at high speed by electrical or electromagnetic power applied through a vibratory arm 31. By having the clipping zones coincident with the tangential bearing surfaces and suitably pitched obliquely to the shank portions or plates 10, a high degree of efficiency and convenience in operation is attained, and by rocking the shear bar upon the rounded points of the spurs 22 the shearing distance from the scalp may be accurately regulated.

Figure 4:
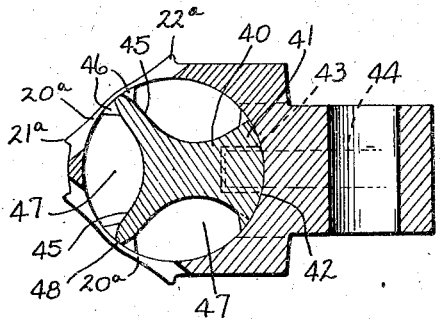
Figure 4 is a view drawn to the same plane as Figure 3, but showing a modified form of construction.
Figure 5:
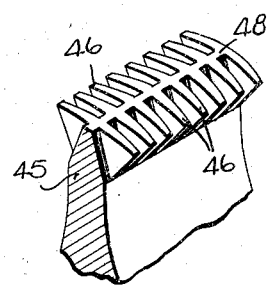
Figure 5 illustrates a fragment of one of the toothed flanges of the cutter bar, showing its shearing face.

In Figures 4 and 5 I have illustrated a modified form of construction, in which a shear bar is employed which may be like that shown in the other views.

But in Figures 4 and 5 the cutter bar is shown as a three-flanged structure, which may be formed of resilient material. The axial portion 40 has a rear flange 41, with an arcuate margin 42 to fit the shear bar bore. A socket 43 in this margin receives the vibratory actuating arm 44.

The other two flanges 45 have arcuate outer margins, which are channeled along each side to form cutter teeth 46, best shown in Figure 5. These cutter teeth operate in a narrow shearing zone substantially midway between the spurs 21a and 22a on the shear bar teeth 20a. Owing to the narrow shearing zone, this clipper operates under very light power and provides maximum space for entry of hair between the shear bar teeth and into the cavities 47 of the cutter bar. The uncut portion 48 of each arm operates as a sweeping web to swing the hair toward a position perpendicular to the shearing zone as the shearing head moves, in either direction, along the scalp.

While I have shown an improved shear bar with two rows of arcuate shearing teeth, it will be understood that only one row of teeth will be in shearing operation at a time, and therefore the other set of teeth may be omitted if desired. Also, while my improved cutter bar is shown with two sets of arcuate teeth facing in opposite directions, only one set of teeth for registry with a single set of teeth on the shear bar may be employed. But I prefer to provide two sets of teeth on each bar, since they can be used in alternation, and the use of the clipper head prolonged accordingly, with better balance than is otherwise obtainable.

This application is divisional to my former application Serial No. 67,195, filed March 5, 1936, for Hair combing, clipping, and shaving heads.

I claim:

1. The combination of a hollow shear bar for a hair clipper provided with sets of obliquely convergent shear teeth having arcuate inner surfaces, each of said teeth having combing spurs on the end portions of its outer surface, the portion between the opposed extremities of the spurs having arcuate outer surfaces adapted for substantial conformity to the scalp, and a cavitated vibratory cutter bar located within the shear bar and having sets of arcuate teeth in registry with the arcuate portions of the shear bar teeth between their spurs, the spurs on the convergent ends of said shear bar teeth being in registry with the cutter bar cavity and adapted to cause the combed hair to enter said cavity to be engaged by the cutter teeth when moving longitudinally through such hair with a combing action.

2. In a mechanism of the described class, a shear bar having a working portion cylindrically curved and a supporting portion longitudinally divided substantially in a plane intersecting the longitudinal center of the working portion, resilient material interposed between the divided portions, and means for clamping such portions upon the resilient material to place the shearing portions under tension, said shearing portions being sufficiently resilient to permit of their pressure engagement with an enclosed cutter bar.

3. In a clipper of the described class, the combination with a shear bar having a working portion provided with two sets of longitudinally extending shearing teeth and an intervening bearing web, and an interior vibratory cutter bar having a pair of hair straightening web-like arms with their outer margins in bearing contact with the sets of shear bar teeth intermediate of the ends of the teeth, said cutter bar arms being each provided with rows of cutter teeth on each side of the arm and in shearing relation to the shear teeth.

4. In a shaving hair clipper, a hollow shear bar having a cylindrical bore and slotted on opposite sides of the longitudinal center line of its working portion to provide sets of convergent shear teeth having arcuate inner surfaces, each shear tooth having a generally tangential outer surface obliquely convergent toward the corresponding tooth of the other set and slightly arched in its central portion, the arched portion of the tooth being relatively thin and constituting the shearing portion of the tooth, a longitudinally vibratory cutter bar mounted within the bore and provided with cutter teeth in registry with said central portions of the shear bar teeth, said cutter bar being spaced from the other portions of the shear bar teeth.

5. In a mechanism of the described class, a shear bar having a cylindrical bore longitudinally open along its rear side, and having a working front portion provided with exterior bearing surfaces in convergent tangential planes and slotted to form convergent sets of shearing teeth on opposite sides of the longitudinal center line of said working portion, in combination with a compressible filler block between the rear margins of the bar, and means for compressing said marginal portions upon the filler block to reduce the diameter of the bore, whereby an interior cutter bar may be forced forwardly against the shearing portions of the shear bar teeth.

6. In a mechanism of the described class, the combination with a vibratory hollow cutter bar having sets of arcuate teeth and an open space between the convergent ends of the opposing teeth of the respective sets, a shear bar having sets of shearing teeth with inner surfaces concentric to the cutter bar teeth, and outer surfaces in convergent planes, arched as to portions in registry with the cutter bar teeth and projecting over the space between the ends of the opposing sets of cutter bar teeth and provided with combing spurs, and an intermediate web connecting the opposing spurred ends of all of the teeth, said web and spurs being adapted to comb hair into the cutter bar in position for a further combing action by the free ends of the cutter bar teeth.

7. In a clipper of the described class, a vibratory cutter bar having a supporting rear portion provided with divergent web-like arms extending forwardly and diverging laterally, said arms having cutter teeth along each side of their outer margins, sufficiently spaced from the teeth carried by the other arm to allow hair to freely enter between the ends of the opposing sets of teeth, in combination with an enclosing shear bar provided with shearing teeth in registry with the cutter teeth, said shearing teeth being extended and provided with spur-like combing projections overhanging the space between the sets of cutter bar teeth, and adapted to comb hair into such space in position to be engaged by the ends of the cutter bar teeth of one set while the shear bar is moved transversely of its axis along the scalp.

8. In a clipper of the described class, a hollow shear bar having a working portion provided with two sets of shearing teeth in convergent planes and an intervening bearing web, in combination with an interior vibratory cutter bar having sets of teeth of less length than those of the shear bar, said sets of cutter bar teeth being more widely spaced from each other than the convergent ends of the shear bar teeth, and means for vibrating the cutter bar teeth across the central portions of the shear bar teeth in shearing relation thereto, the portions of the shearing teeth in bearing contact with the cutter bar teeth being relatively thin as compared with the portions adjacent said bearing web.

MATHEW ANDIS.